(12) United States Patent
Kim et al.

(10) Patent No.: US 7,928,332 B2
(45) Date of Patent: Apr. 19, 2011

(54) BRAKE PEDAL STOP LAMP SWITCH

(75) Inventors: Eunsik Kim, Daegu (KR); Yangrae Cho, Hwaseong-si (KR)

(73) Assignees: Kia Motors Corporation, Seoul (KR); Hyundai Motor Company, Seoul (KR); SL Corporation, Dae-Gu (KR)

( * ) Notice: Subject to any disclaimer, the term of this patent is extended or adjusted under 35 U.S.C. 154(b) by 267 days.

(21) Appl. No.: 12/132,784

(22) Filed: Jun. 4, 2008

(65) Prior Publication Data

US 2009/0152080 A1    Jun. 18, 2009

(30) Foreign Application Priority Data

Dec. 15, 2007 (KR) .................. 10-2007-0131734

(51) Int. Cl.
    *H01H 3/14*     (2006.01)
(52) U.S. Cl. .................... 200/61.89; 200/61.5
(58) Field of Classification Search ............. 200/61.89, 200/295, 296
    See application file for complete search history.

(56) References Cited

U.S. PATENT DOCUMENTS

| 4,894,652 | A  | * | 1/1990  | Eckstein et al. ............ 340/467 |
| 6,330,838 | B1 | * | 12/2001 | Kalsi .......................... 74/514 |
| 6,919,520 | B2 | * | 7/2005  | Kasakawa et al. ........ 200/61.89 |

FOREIGN PATENT DOCUMENTS

| JP | 6-334937 A     | 12/1994 |
| JP | 9-226542       | 9/1997  |
| JP | 2000-62528     | 2/2000  |
| JP | 2000-293249    | 10/2000 |
| KR | 10-2005-0121790 | 12/2005 |
| KR | 10-0729338 B1  | 6/2007  |

* cited by examiner

*Primary Examiner* — Renee Luebke
*Assistant Examiner* — Lisa Klaus
(74) *Attorney, Agent, or Firm* — Morgan, Lewis & Bockius LLP

(57) ABSTRACT

A brake pedal stop lamp switch assembly includes a pedal switch plate fixed to a car body, a switch-fixing bracket mounted to the pedal switch plate and having at least one or more fixing-protrusions, a switch assembly linearly moving in a pressing direction in the switch-fixing bracket, and a hall-effect sensor that generates a signal when a magnet attached to upper portion of pedal stopper plate approaches and an electronic circuit that receives signals of the hall-effect sensor, and a plurality of teeth formed at the switch assembly to fix the switch assembly that has linearly moved relative to the switch-fixing bracket, engaged with the fixing-protrusion of the switch-fixing bracket.

12 Claims, 7 Drawing Sheets

FIG.5
(A)
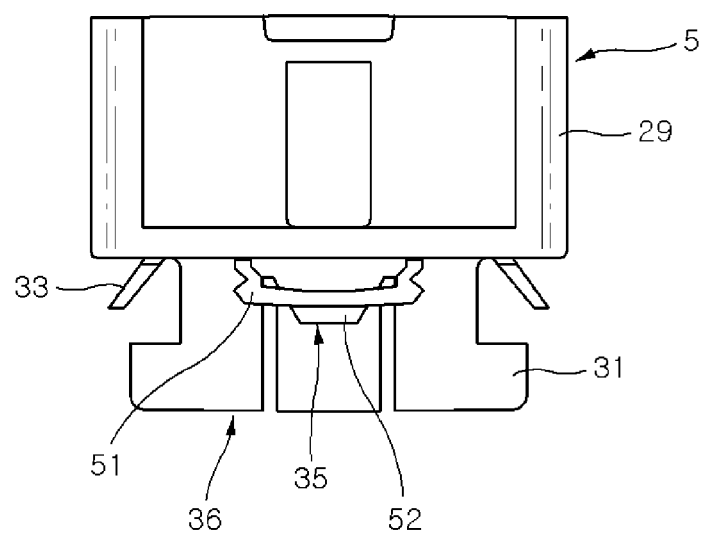
(B)
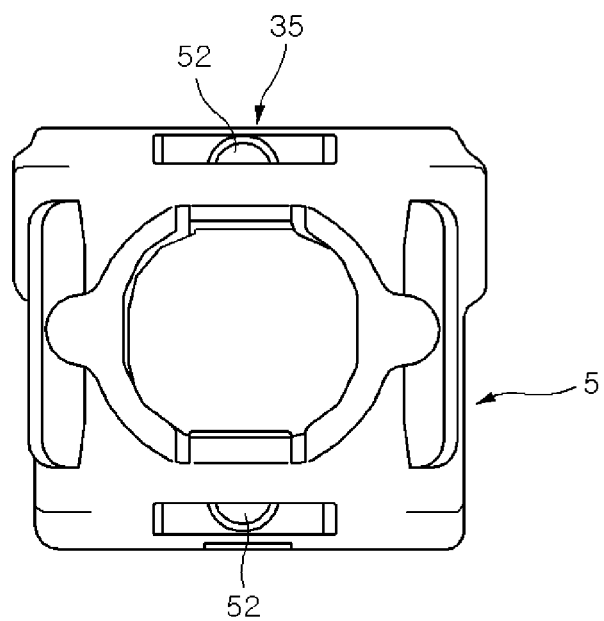

BRAKE PEDAL STOP LAMP SWITCH

CROSS-REFERENCE TO RELATED APPLICATIONS

The present application is based on, and claims priority from, Korean Application Serial Number 10-2007-0131734, filed on Dec. 15, 2007, the disclosure of which is hereby incorporated by reference herein in its entirety.

FIELD OF THE INVENTION

The present invention relates to a brake pedal stop lamp switch assembly that generates an electrical signal to show whether the brake pedal of a vehicle is engaged, particularly a brake pedal stop lamp switch assembly that does not have an electrical contact point and is mounted without specific arrangement.

BACKGROUND OF THE INVENTION

As well known in the art of a brake pedal stop lamp switch assembly mounted in a vehicle, the brake pedal stop lamp switch with a nut-shifting portion through a pedal plate is fastened by nuts.

In detail, the brake pedal stop lamp switch is adjusted to a desired position from a pedal stopper mounted to a brake pedal by adjusting the position of nuts fitted on nut-shifting portion at both sides of pedal plate.

However, according to the related arts of brake pedal stop lamp switch described above, brake pedal stop lamp switch may be shifted while nuts are tightened, such that it is difficult to adjust the brake pedal stop lamp switch to the exact position from brake pedal. Further, it takes much time to tighten and loosen nuts, thereby considerably reducing the assembly efficiency.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a brake pedal stop lamp switch that can be simply and accurately mounted at a desired position from a brake pedal with improved assembly efficiency.

A brake pedal stop lamp switch according to an embodiment of the invention may include: a pedal switch plate fixed with respect to a car body; a switch-fixing bracket mounted to the pedal switch plate and having at least a fixing-protrusion; a switch assembly linearly moving in a pressing direction through the switch-fixing bracket, and including a hall-effect sensor that generates a signal when a magnet approaches and an electronic circuit that receiving the signal of the hall-effect sensor; at least a tooth formed in the switch assembly to fix the switch assembly that has linearly moved relative to the switch-fixing bracket, engaged with the fixing-protrusion of the switch-fixing bracket; and the magnet fixed with respect to the brake pedal for the hall-effect sensor of the switch assembly.

The pedal switch plate may be coupled to a brake member bracket fixed to the car body, the magnet is mounted to a pedal stopper plate connected to the brake pedal, and a stopper is mounted to the pedal stopper plate to cover and protect the magnet.

The pedal switch plate may comprise: a circular mounting-hole formed through the pedal switch plate to mount the switch-fixing bracket; at least a locking-protrusion insertion groove formed along the circumference of the mounting-hole; and at least a protruding seat formed at predetermined distances from the locking-protrusion insertion grooves around circumference of the mounting-hole, recessed in the insertion direction of the switch-fixing bracket, and the switch-fixing bracket has: a body where the switch assembly is inserted; locking-protrusions integrally formed with the body and overlapping the protruding seats, when inserted through the locking-protrusion insertion grooves and then turned; elastic guides protruding down from the body and deforming when the locking-protrusions overlap the protruding seat to remove the gap between the body and the locking-protrusions; and elastic snaps integrally formed with the body and fitted in the locking-protrusion insertion grooves by elastic deformation when the locking-protrusions overlap the protruding seats.

The switch assembly may include an upper case covering the hole sensor and the electronic circuit receiving signals from the hole sensor and a lower case combined to the lower portion of the upper case and having the teeth vertically arranged.

In another exemplary embodiment of the present invention, a brake pedal stop lamp switch assembly, may comprise: a pedal stopper plate coupled to a portion of a brake pedal hinged to a car body; a pedal switch plate fixed to a car body; a switch-fixing bracket upwardly mountable to the pedal switch plate; and a switch assembly upwardly mountable to the switch-fixing bracket, wherein lower end of the switch assembly is positioned above the pedal stopper plate through the switch-fixing bracket.

The pedal switch plate may comprise: a mounting-hole formed through the pedal switch plate to mount the switch-fixing bracket; at least a locking-protrusion insertion groove formed along circumference of the mounting-hole; and at least a protruding seat formed at predetermined rotational distance from the locking-protrusion insertion groove, protruding toward the pedal stopper plate.

The switch-fixing bracket may comprise: a body through which lower portion of the switch assembly is inserted; a guiding portion extending downwards from lower surface of the body; at least a locking-protrusion extending from lower portion of the guiding portion outwards, and overlapping the protruding seat of the pedal switch plate when inserted through the locking-protrusion insertion grooves and then turned; elastic guides protruding downwards from the body and deforming when the locking-protrusions overlap the protruding seat of the pedal switch plate to remove gap between the body and the locking-protrusions; and elastic snaps protruding downwards from the body and elastically deformed on the locking-protrusion insertion grooves when the locking-protrusions overlap the protruding seats.

The elastic guides may protrude downwards from the body with a predetermined slant outwards.

The elastic snap may further comprise: a cushion member extending downwards from lower surface of the body, wherein the longitudinal length of the cushion member is substantially larger than diameter of the locking-protrusion insertion groove of the pedal switch panel; and a snapping skirt extending from rear surface of lower portion of the cushion member outwards.

The pedal switch plate may be fixed to the car body via a brake member bracket.

The switch assembly may include a hall-effect sensor and a magnet is mounted to the pedal stopper plate within a distance that the hall-effect sensor can sense the magnet.

The switch assembly may include an upper case covering the hall-effect sensor and the electronic circuit receiving signals from the hall-effect sensor and a lower case combined to the lower portion of the upper case and having the teeth vertically arranged.

A stopper may be mounted to the pedal stopper plate and covers the magnet.

According to an embodiment of the invention, it is possible to simply and accurately mount a brake pedal stop lamp switch at a desired position from a brake pedal, such that it is possible to significantly improve the assembly efficiency of the brake pedal stop lamp switch.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 5 is side and bottom views illustrating the structure of a switch-fixing bracket shown in FIG. 2 according to an embodiment of the invention;

Figure 1:
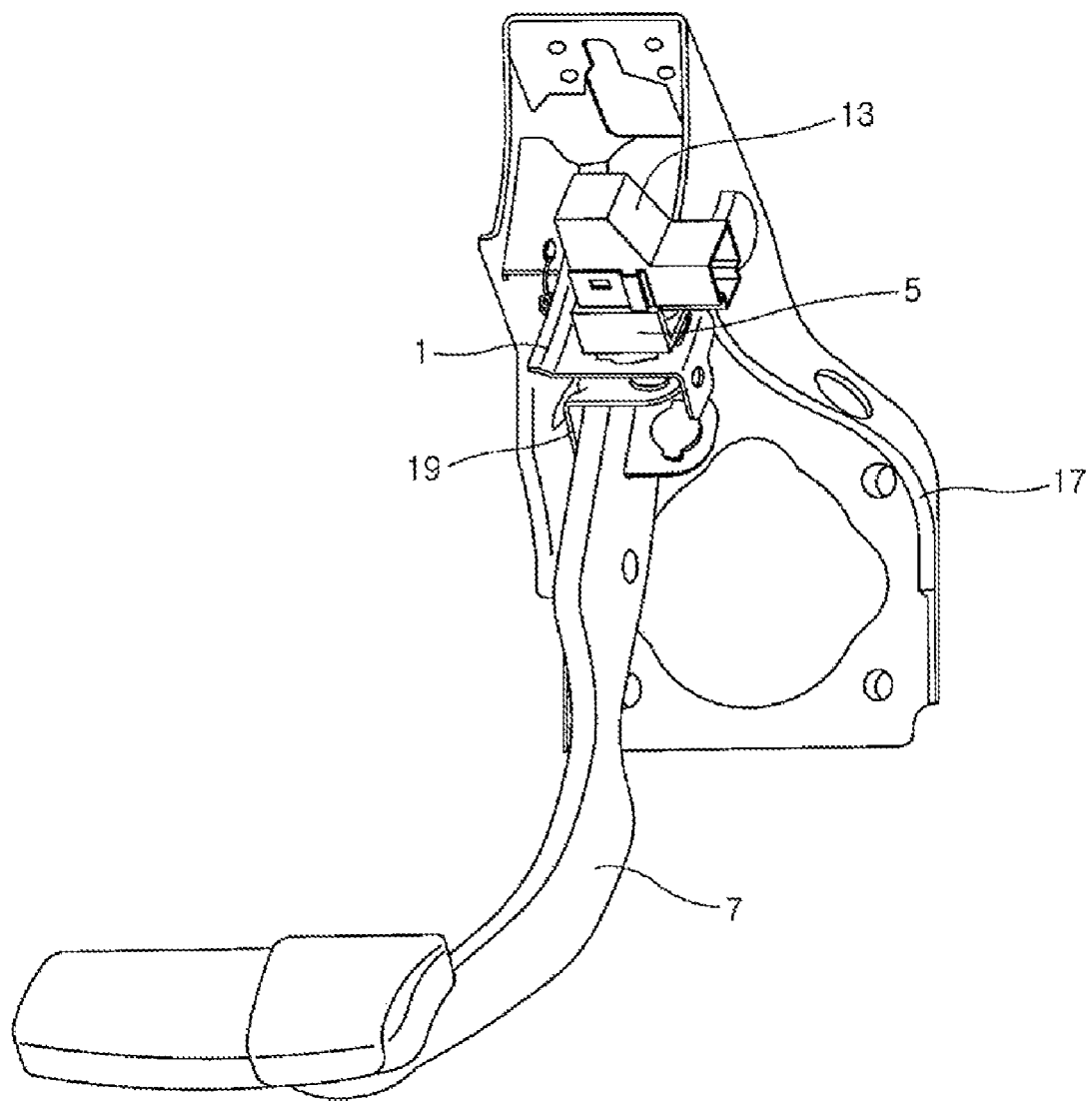
FIG. 1 is a view showing a brake pedal stop lamp switch assembly mounted according to an embodiment of the invention.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIGS. 1 to 7, a brake pedal stop lamp switch assembly according to an embodiment of the invention includes: a pedal switch plate 1 fixed with respect to a car body; a switch-fixing bracket 5 mounted to the pedal switch plate 1 and having at least one or more fixing-protrusions 3 therein; a magnet 9 fixed to upper portion of a pedal stopper plate 19; a switch assembly 13 linearly movable in a pressing direction in switch-fixing bracket 5 and including a hall-effect sensor 11 that generates a signal when the magnet 9 approaches and an electronic circuit 41 that operates hall-effect sensor 11 and receives sensing signals from the hall-effect sensor 11; and a plurality of teeth 15 formed at lower portion of the switch assembly 13 to fix the switch assembly 13 that has linearly moved along lower portion of the switch-fixing bracket 5, and engaged with the fixing-protrusion 3 formed inside the lower portion of the switch-fixing bracket 5.

Pedal switch plate 1 is fastened to a brake member bracket 17 directly fixed to the car body, such that pedal switch plate 1 is also fastened with respect to the car body.

Body of the brake pedal 7 is engaged to a pedal stopper plate 19 which is mounted above the brake pedal 7. End portion of the brake pedal 7 is pivotally coupled to the car body. In this configuration the switch assembly 13 is coupled to the switch-fixing bracket 5 which is engaged to the pedal switch plate 1 fixed to the car body. Accordingly, the pedal stopper plate 19 coupled to upper portion of the brake pedal 7 can pivotally move with respect to the car body from the switch assembly 13 in response to rotation of the brake pedal 7.

Figure 2:
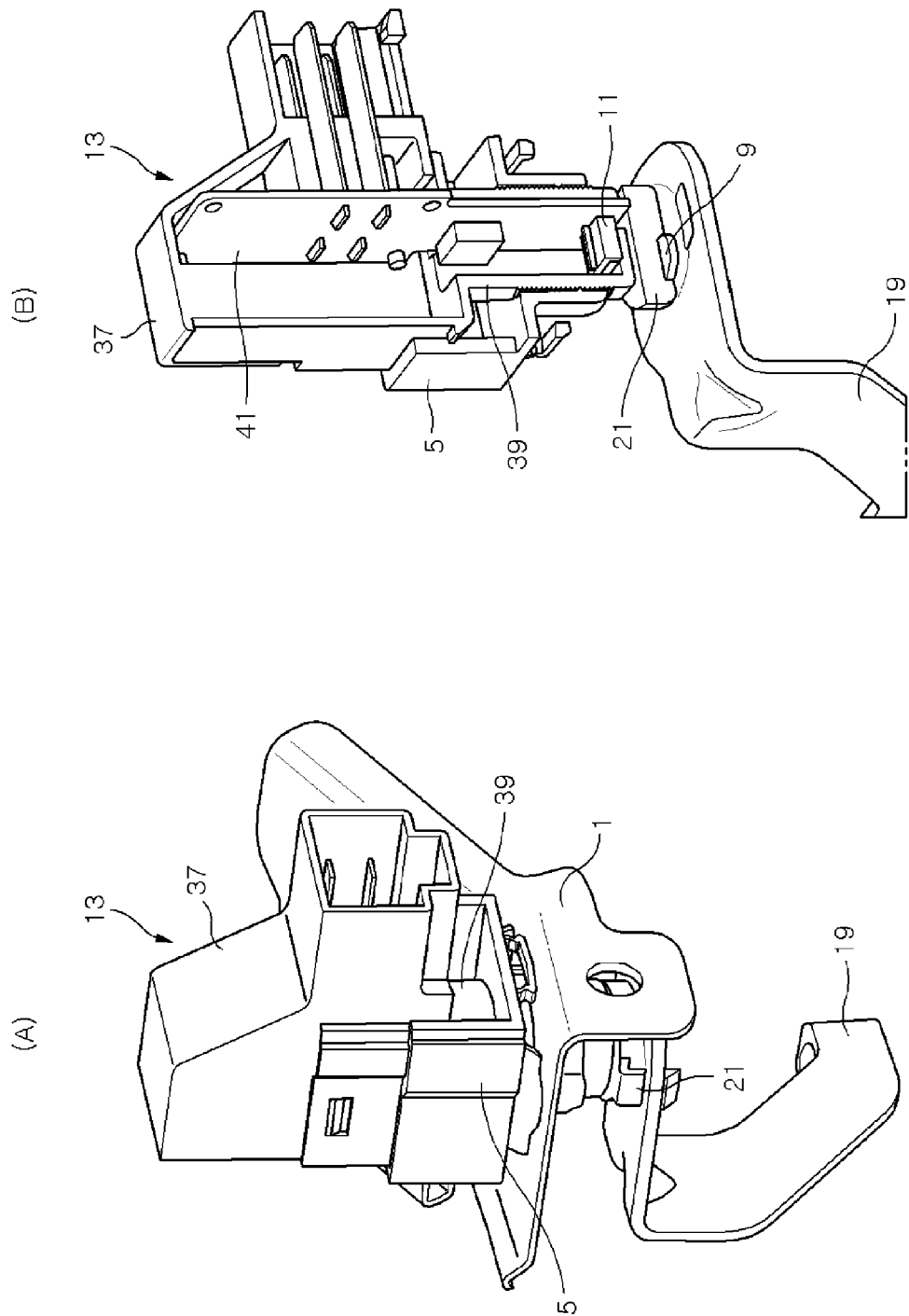
FIG. 2 is a view illustrating the detailed structure of a brake pedal stop lamp switch assembly according to an embodiment of the invention.
Figure 3:
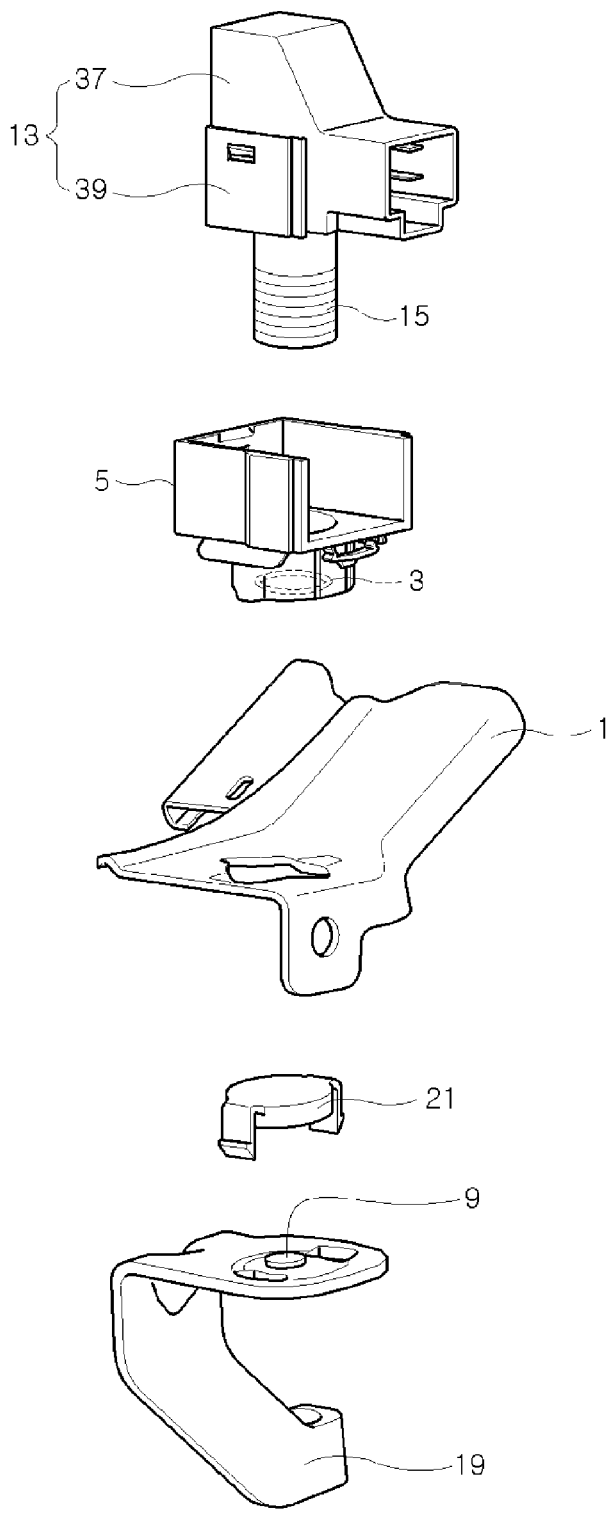
FIG. 3 is an exploded perspective view of main parts according to an embodiment of the invention.

As shown in FIG. 2, a magnet 9 is fixed to upper portion of the pedal stopper plate 19 directly coupled to a body of the brake pedal 7, and a stopper 21 is combined to the upper portion of the pedal stopper plate 19 to cover and protect the magnet 9.

More detailed explanation about the pedal switch plate 1 and switch-fixing bracket 5 will be followed hereinafter.

Figure 4:
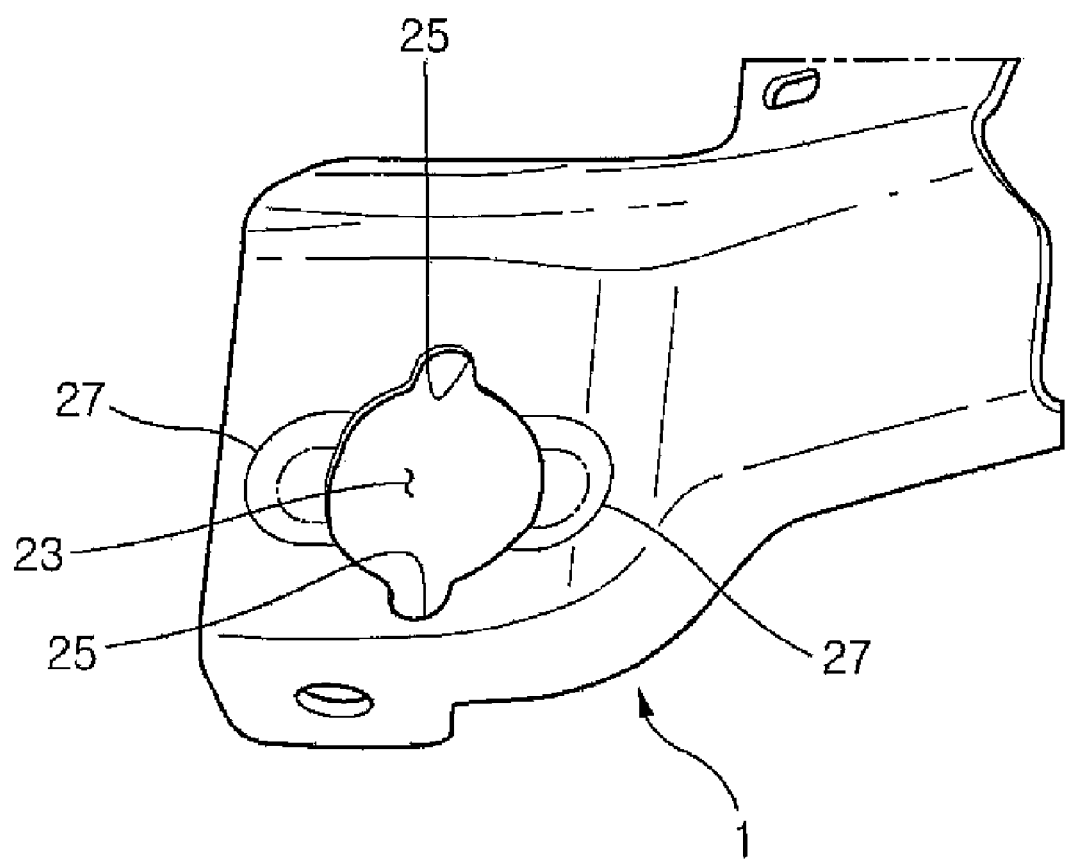
FIG. 4 is a detailed top view of a pedal switch plate shown in FIG. 2 according to an embodiment of the invention.

As shown in FIG. 4, in an exemplary embodiment of the present invention, a circular mounting-hole 23 is formed at a substantially flat lower portion of the pedal switch plate 1 to mount the switch-fixing bracket 5. At least a locking-protrusion insertion groove 25 is formed along the circumference of circular mounting-hole 23. In addition, protuding seats 27 dented downwards are formed at predetermined rotational distances from the locking-protrusion insertion grooves 25 around the circumference of mounting-hole 23.

As shown in FIG. 5, in an exemplary embodiment of the present invention, the switch-fixing bracket 5 comprises: a body 29 which the switch assembly 13 is inserted into; guiding portion 36 extending downwards from lower surface of the body 29; locking-protrusions 31 integrally formed at lower portion of the guiding portion 36 and overlapping protruding seats 27 after inserted through locking-protrusion insertion grooves 25 of the pedal switch plate 1 and turned; elastic guides 33 protruding downwards with a predetermined slant from lower surface of the body 29 and elastically-deforming outwardly as the elastic guides 33 are pressed downwards when the locking-protrusions 31 of the switch-fixing bracket 5 overlap protruding seat 27 of the pedal switch plate 1 to remove gap between the body 29 and locking-protrusions 31; and elastic snaps 35 integrally formed on the lower surface of the body 29.

The elastic snaps 35 comprises cushion member 51 and snapping skirt 52 formed at lower portion of the cushion member 51 and extending outwards from rear surface of the cushion member 51 as shown in FIG. 5 to provide elastic force in the up-down and radial directions. The snapping skirt 52 is fitted in locking-protrusion insertion grooves 25 of the pedal switch plate 1 and the longitudinal length of the cushion member 51 is larger than the diameter of the locking-protrusion insertion grooves 25 such that the cushion member may be elastically deformed on the locking-protrusion insertion grooves 25 when locking-protrusions 31 of the switch-fixing bracket 5 is turned and overlaps protruding seats 27 of the pedal switch plate 1.

Accordingly, the elastic snaps 35 also remove the gap between body 29 and locking-protrusions 31, like the elastic guide 33.

Figure 6:
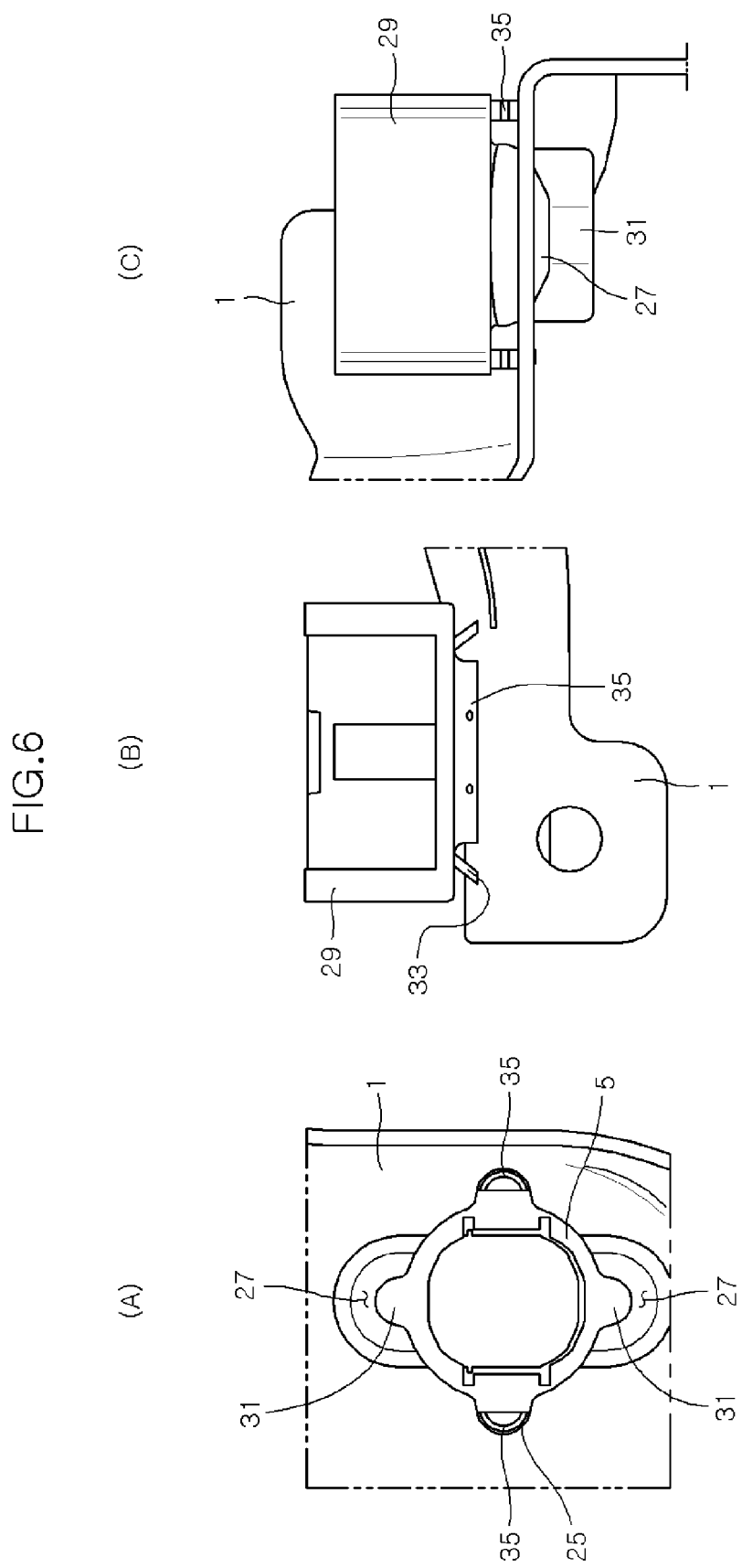
FIG. 6 is bottom and side views illustrating switch-fixing bracket mounted to the pedal switch plate, seen from various angles according to an embodiment of the invention.

Referring to FIG. 6 for the detailed explanation, snapping skirt 52 of the elastic snaps 35 is positioned under the pedal switch plate 1 when assembled and have an arc-shape that is convex outside mounting-hole 23.

It is preferable that switch-fixing bracket 5 is made of plastic to integrally forma single body comprising elastic snaps 35, elastic guides 33, body 29, guide portion 36, and locking-protrusions 31.

Figure 7:
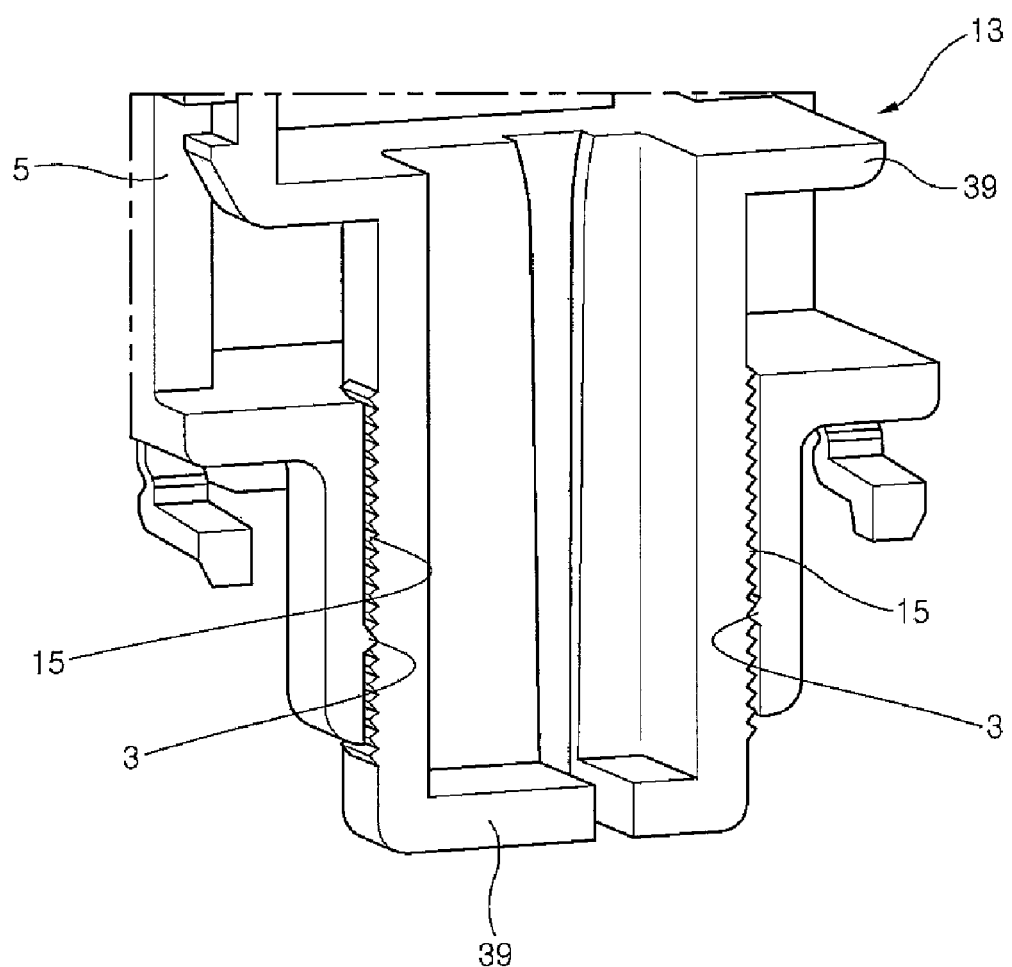
FIG. 7 is a cross-sectional side view illustrating a switch assembly mounted to the switch-fixing bracket according to an embodiment of the invention.

Switch assembly 13, as shown in FIGS. 2 and 7, includes an upper case 37 covering electronic circuit 41 and a lower case 39 combined to the lower portion of upper case 37 and including hall-effect sensor 11 sending sensing signals to the electronic circuit 41 and teeth 15 formed vertically on outer circumference of the lower portion of lower case 39.

In the instant configuration, as a magnet 9 installed on upper portion of the pedal stopper plate 19 approaches or moves away from hall-effect sensor 11 in accordance to movement of the brake pedal 7, electronic circuit 41 receiving sensing signals from the hall-effect sensor 11 generates electrical signals to the outside.

Teeth 15 of the lower case 39 may be formed in the shape of gear teeth, but are not limited thereto, and may have any shape as long as they can be engaged with fixing-protrusions 3 of switch-fixing bracket 5 as the lower case 39 of the switch assembly 13 reciprocates.

A process of mounting a brake pedal stop lamp switch assembly having the above configuration will be illustrated hereinafter.

As switch-fixing bracket 5 is inserted into pedal switch plate 1 and then turned, locking-protrusions 31 of the switch-fixing bracket 5 overlap protruding seat 27 of the pedal switch plate 1, and the snapping skirt 52 of the elastic snaps 35 are elastically fitted into locking-protrusion insertion grooves 25 to fix the switch-fixing bracket 5. Outward deformation of the elastic guides 33 and vertical deformation of the cushion member 51 at the elastic snaps 35 remove the gap between body 29 and the locking-protrusions 31. As a result, switch-fixing bracket 5 is firmly fixed to pedal switch plate 1.

With the brake pedal 7 stopped at the initial position, i.e., the state that the brake pedal 7 is not pressed, the switch assembly 13 is inserted into switch-fixing bracket 5 such that lower end of lower case 39 contacts with stopper 21 of pedal stopper plate 19. As a result, the switch fixing-bracket 5 and the switch assembly 13 are coupled by teeth 15 of the switch assembly 13 and locking protrusions 31 of the switch-fixing bracket 5, such that locating and fixing switch assembly 13 are completed at once.

That is, mounting and locating switch assembly 13 are completed at once only by simple work, in other words, pushing switch assembly 13 into switch-fixing bracket 5, with brake pedal 7 stopped.

Further, switch assembly 13 can be simply located using another method. That is, the switch assembly 13 is appropriately pushed into switch-fixing bracket 5, with brake pedal 7 pushed. Thereafter, when the brake pedal 7 is released, it returns, pushing switch assembly 13. As a result, switch assembly 13 is located and fixed at a position by locking-protrusions 31 and teeth 15.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A brake pedal stop lamp switch assembly, comprising:
   a pedal switch plate configured to be fixed with respect to a car body;
   a switch-fixing bracket mounted to the pedal switch plate and having at least a fixing-protrusion;
   a switch assembly linearly movable in a pressing direction through the switch-fixing bracket, and including a hall-effect sensor that generates a signal when a magnet approaches and an electronic circuit that receives the signal of the hall-effect sensor;
   at least a tooth formed in the switch assembly to fix the switch assembly that is linearly movable relative to the switch-fixing bracket, engaged with the fixing-protrusion of the switch-fixing bracket; and
   the magnet fixed with respect to the brake pedal for the hall-effect sensor of the switch assembly;
   wherein the switch assembly is installed to be inserted through the switch-fixing bracket, and the fixing protrusion is monolithically formed on the switch-fixing bracket.

2. The brake pedal stop lamp switch assembly as defined in claim 1, wherein the pedal switch plate is coupled to a brake member bracket fixed to the car body, the magnet is mounted to a pedal stopper plate connected to the brake pedal, and a stopper is mounted to the pedal stopper plate to cover and protect the magnet.

3. The brake pedal stop lamp switch assembly as defined in claim 1, wherein the pedal switch plate comprises:
   a circular mounting-hole formed through the pedal switch plate to mount the switch-fixing bracket;
   at least a locking-protrusion insertion groove formed along a circumference of the mounting-hole; and
   at least a protruding seat formed at predetermined distances from the locking-protrusion insertion grooves around the circumference of the mounting-hole, recessed in an insertion direction of the switch-fixing bracket, and
   the switch-fixing bracket has:
      a body where the switch assembly is inserted;
      locking-protrusions integrally formed with the body and overlapping the at least a protruding seat, when inserted through the locking-protrusion insertion grooves and then turned;
      elastic guides protruding down from the body and deforming when the locking-protrusions overlap the at least a protruding seat to remove a gap between the body and the locking-protrusions; and
      elastic snaps integrally formed with the body and fitted in the locking-protrusion insertion grooves by elastic deformation when the locking-protrusions overlap the at least a protruding seat.

4. The brake pedal stop lamp switch assembly as defined in claim 1, wherein the switch assembly includes an upper case covering the hall-effect sensor and the electronic circuit receiving signals from the hall-effect sensor and a lower case combined to a lower portion of the upper case and having the at least a tooth vertically arranged.

5. A brake pedal stop lamp switch assembly comprising:
a pedal stopper plate coupled to a portion of a brake pedal configured to be hinged to a car body;
a pedal switch plate fixed to the car body;
a switch-fixing bracket upwardly mountable to the pedal switch plate; and
a switch assembly upwardly mountable to the switch-fixing bracket, wherein a lower end of the switch assembly is positioned above the pedal stopper plate through the switch-fixing bracket;
wherein the pedal switch plate comprises:
   a mounting-hole formed through the pedal switch plate to mount the switch-fixing bracket;
   at least a locking-protrusion insertion groove formed along a circumference of the mounting-hole; and
   at least a protruding seat formed at a predetermined rotational distance from the at least a locking-protrusion insertion groove, protruding toward the pedal stopper plate.

6. The brake pedal stop lamp switch assembly as defined in claim 5, wherein the switch-fixing bracket comprises:
a body through which a lower portion of the switch assembly is inserted;
a guiding portion extending downwards from a lower surface of the body;
at least a locking-protrusion extending from a lower portion of the guiding portion outwards, and overlapping the at least a protruding seat of the pedal switch plate when inserted through the at least a locking-protrusion insertion groove and then turned;
elastic guides protruding downwards from the body and deforming when the at least a locking protrusion overlaps the at least a protruding seat of the pedal switch plate to remove a gap between the body and the at least a locking-protrusion; and
elastic snaps protruding downwards from the body and elastically deformed on the locking-protrusion insertion grooves when the locking-protrusions overlap the protruding seats.

7. The brake pedal stop lamp switch assembly as defined in claim 6, wherein the elastic guides protrude downwards from the body with a predetermined slant outwards.

8. The brake pedal stop lamp switch assembly as defined in claim 6, wherein the elastic snaps further comprise:
a cushion member extending downwards from the lower surface of the body, wherein a longitudinal length of the cushion member is substantially larger than a diameter of the at least a locking-protrusion insertion groove of the pedal switch panel; and
a snapping skirt extending from a rear surface of a lower portion of the cushion member outwards.

9. The brake pedal stop lamp switch assembly as defined in claim 6, wherein the pedal switch plate is fixed to the car body via a brake member bracket.

10. The brake pedal stop lamp switch assembly as defined in claim 6, wherein the switch assembly includes a hall-effect sensor and a magnet is mounted to the pedal stopper plate within a distance that the hall-effect sensor can sense the magnet.

11. The brake pedal stop lamp switch assembly as defined in claim 10, wherein the switch assembly includes an upper case covering the hall-effect sensor and an electronic circuit receiving signals from the hall-effect sensor and a lower case combined to a lower portion of the upper case and having at least a tooth vertically arranged.

12. The brake pedal stop lamp switch assembly as defined in claim 10, wherein a stopper is mounted to the pedal stopper plate and covers the magnet.

* * * * *